United States Patent [19]

Nishiwaki et al.

[11] Patent Number: 5,343,038
[45] Date of Patent: Aug. 30, 1994

[54] SCANNING LASER MICROSCOPE WITH PHOTO COUPLING AND DETECTING UNIT

[75] Inventors: Seiji Nishiwaki; Junichi Asada; Shinji Uchida, all of Osaka, Japan

[73] Assignee: Matsushita Electric Industrial Co., Ltd., Osaka, Japan

[21] Appl. No.: 988,972

[22] Filed: Dec. 10, 1992

[30] Foreign Application Priority Data

Dec. 12, 1991 [JP] Japan .................................. 3-328726

[51] Int. Cl.⁵ ............................................. H01J 3/14
[52] U.S. Cl. ...................................... 250/234; 385/37
[58] Field of Search .................. 250/201.3, 208.6, 226, 250/234, 235; 385/31, 37, 35, 48

[56] References Cited

U.S. PATENT DOCUMENTS

| | | | |
|---|---|---|---|
| 4,521,680 | 6/1985 | Ando | 250/201.3 |
| 4,861,982 | 8/1989 | Smid et al. | 250/235 |
| 4,971,414 | 11/1990 | Funato et al. | 250/201.5 |
| 4,991,919 | 2/1991 | Nishiwaki et al. | 385/37 |
| 5,032,720 | 7/1991 | White. | |
| 5,272,330 | 12/1993 | Betzig et al. | 250/227.2 |

FOREIGN PATENT DOCUMENTS 0274155 7/1988 European Pat. Off. .
0307029 3/1989 European Pat. Off. .
WO90/01716 2/1990 PCT Int'l Appl. .

OTHER PUBLICATIONS

Journal of the Japan Society for Precision Engineering, (pp. 33-36, Jul. 1991).

Primary Examiner—Edward K. Look
Assistant Examiner—James A. Larson
Attorney, Agent, or Firm—Willian Brinks Hofer Gilson & Lione

[57] ABSTRACT

A scanning color laser microscope comprises red, green and blue laser sources, objective lenses for focusing R, G and B laser emitted from R, G and B laser sources on a specimen, respectively, condenser lenses for condensing R, G and B laser lights reflected from or transmitted through the specimen, wave guide layers formed on a substrate to receive R, G and B laser lights condensed, respectively, photo couplers arranged on the wave guide layers, respectively, each of which excites a guided light when the laser light condensed is incident to corresponding wave guide layer and photodetectors for detecting respective guided light excited.

9 Claims, 7 Drawing Sheets

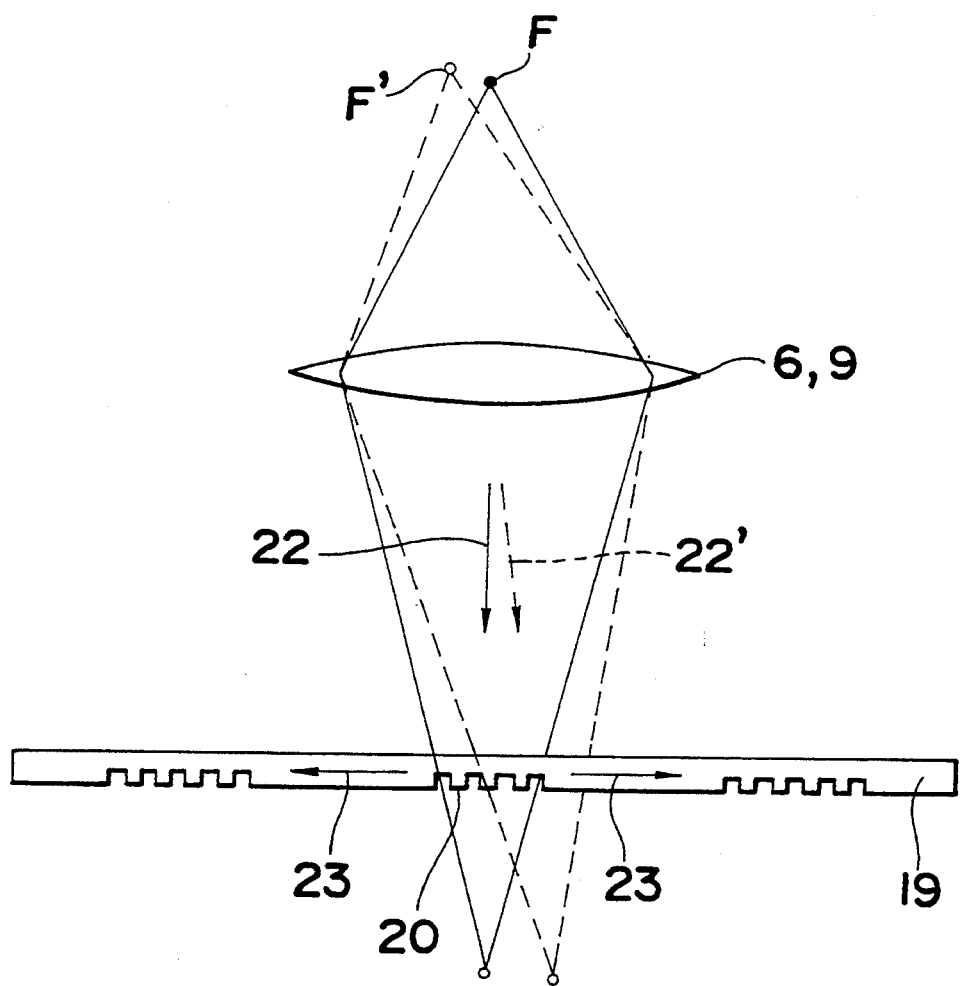

SCANNING LASER MICROSCOPE WITH PHOTO COUPLING AND DETECTING UNIT

BACKGROUND OF THE INVENTION

1. Field of the invention

The present invention relates to a scanning laser microscope which is extremely simple to adjust and combines confocal effects with detection sensitivity.

2. Description of the prior art

Research and development of scanning laser microscopes which use a laser beam as the scanning microscope light source has advanced quickly, and scanning laser microscopes are already in commercial use.

An example of the conventional scanning laser microscope is described below with reference to accompanying figures. A good example of the conventional scanning laser microscope is described in the Journal of the Japan Society for Precision Engineering (p. 35, July, 1991), and the construction is shown in FIG. 7.

This scanning laser microscope system uses three laser beams, a red laser beam 1R emitted from a He—Ne laser or other red laser source, a green laser beam 1G emitted from an Ar laser (515 nm) or other green laser source, and a blue laser beam 1B emitted from an Ar laser (488 nm) or other blue laser source. The other essential components are concave lenses 2R, 2G, and 2B, convex lenses 3R, 3G, and 3B, dichroic mirrors 4G, 4B, and 8G, 8B, a beam splitter 5, an objective lens 6, focusing lenses 9R, 9G, and 9B, pinholes 10R, 10G and 10B, detectors 11R, 11G, and 11B, video amplifiers 12R, 12G, and 12B, and a color monitor 13. The specimen being analyzed is shown as 7 in the figure.

As shown in FIG. 7, the red laser beam 1R is expanded by the concave lens 2R and convex lens 3R, passes through the dichroic mirrors 4G and 4B and the beam splitter 5, and is focused on the specimen 7 by the objective lens 6. The reflected light from the specimen 7 is collimated by the objective lens 6, reflected by the beam splitter 5 and passes the dichroic mirrors 8B, 8G, and is focused by the focusing lens 9R on the pinhole 10R. The light passing the pinhole 10R is detected by the detector 11R, and the output signal is amplified by the video amplifier 12R.

The green laser beam 1G (blue laser beam 1B) is expanded by the concave lens 2G (2B) and convex lens 3G (3B), is reflected by the dichroic mirror 4G (4B) and passes the beam splitter 5, and is focused on the specimen 7 by the objective lens 6. The reflected light from the specimen 7 is collimated by the objective lens 6, reflected by the beam splitter 5 to the dichroic mirrors 8G (8B), and reflected by the dichroic mirrors 8G (8B) to the focusing lens 9G (9B). The light is then focused by the focusing lens 9G (9B) on the pinhole 10G (10B). The passed light is detected by the detector 11G (11B), and the output signal is amplified by the video amplifier 12G (12B).

The video signal from the specimen 7 is obtained on the color monitor 13 by capturing these amplified signals and either fixing the light beam and scanning the specimen 7, or fixing the specimen 7 and scanning the light beam.

FIG. 8 illustrates the effect of inserting a pinhole. When the spot of the laser beam on the specimen is at objective lens focal point F, the return light passing through the objective lens 6 and the focusing lens 9 is refocused at the pinhole 10 as indicated by the solid line in the figure. The focused beam thus passes through the pinhole 10 and is incident upon the detector 11. When the spot is offset from focal point F to F', however, the return light is blocked by the pinhole 10 and is therefore not incident upon the detector 11 as shown by the dotted line.

A scanning laser microscope that uses pinholes as described is known as a "confocal" device. The advantages of the confocal microscope include an approximately 40 percent increase in resolution compared with non-confocal designs, extremely high contrast due to the cut-off of extraneous scattered light by the pinholes, and extremely high resolution in the depth of field. These effects are collectively called "confocal effects," and become more pronounced as the pinhole diameter decreases.

The conventional confocal scanning laser microscope as thus described does present the following problems, however. Specifically, because the focused spot on the detector side in this conventional device has a three-dimensional spread, pinhole position adjustment also requires adjusting the position on three axes. In addition, adjusting the position of the pinhole must also be on the order of the laser beam wavelength because the pinhole 10 diameter is approximately the circular area of the focused spot, that is, on the order of the wavelength.

It is therefore extremely difficult to adjust the pinhole, and the position is also easily affected by natural offsets in the optical system due to secular change. In addition, while the confocal effects can be improved by decreasing the pinhole diameter, this also decreases the amount of light incident on the detector. As such, there is an obvious trade-off between confocal effects and detection sensitivity.

SUMMARY OF THE INVENTION

Therefore, an object of the present invention is to provide a scanning laser microscope characterized by easy adjustment, minimal change in precision due to changes with time, and an economical, simple construction.

To achieve these objects, a scanning laser microscope according to the present invention comprises at least one laser light source, an objective lens for focusing the light from this light source on the specimen surface, and a mirror for guiding the return light from the specimen (or the transmitted light) to a wave guide on which is formed an optical coupling means having a cyclical structure of lands and channels. This scanning laser microscope is characterized by coupling the return light (or transmitted light) with the guided light by means of this cyclical structure for detection. The cyclical structure preferably has a concentric ring configuration, at which time a ¼ wavelength plate and focusing lens are inserted between the mirror and wave guide.

Furthermore, when the cyclical structure is a concentric ring configuration, the scanning laser microscope is characterized by inputting the laser beam to the wave guide at an angle by means of a tilting means that inclines the wave guide to the optical axis, and separately detecting the guided light of different wavelengths by means of a detector divided into at least three regions along radius vectors passing the center of the concentric rings. In addition, a photodetector is formed on the front surface of a Si substrate, the wave guide is formed on a Si substrate sandwiching a buffer layer, part of the buffer layer is exposed by etching the back surface of the Si substrate, the optical coupling means is contained within the area of the exposed buffer layer, the detector is contained outside the area of the exposed buffer layer, and the laser beam is input from the back side of the Si substrate.

By means of this construction, only those components of the input light that satisfy the phase matching conditions are input to the wave guide and detected as the guided light. Furthermore, when the cyclical structure is a concentric ring configuration and the laser beam is input at an angle to the wave guide, the wave guide azimuth depends on the angle of inclination, and any difference in the wavelength of the input light appears as a difference in the wave guide azimuth. Therefore, by dividing the detector into regions according to the radius vector passing the concentric ring center and detecting the wave guide light quantity separately in each region, the wave guide light for each wavelength can be detected separately. In addition, by forming the wave guide on a Si substrate and inputting the laser beam from the back side of the Si substrate, the Si substrate also functions as a light shield preventing any light other than the guided light from entering the detector.

BRIEF DESCRIPTION OF THE DRAWINGS

The present invention will become more fully understood from the detailed description given below and the accompanying diagrams wherein:

FIG. 3 is an illustration for explanating an action of the photo coupling and detecting unit in the first embodiment of the present invention.

DESCRIPTION OF PREFERRED EMBODIMENTS

Figure 1:
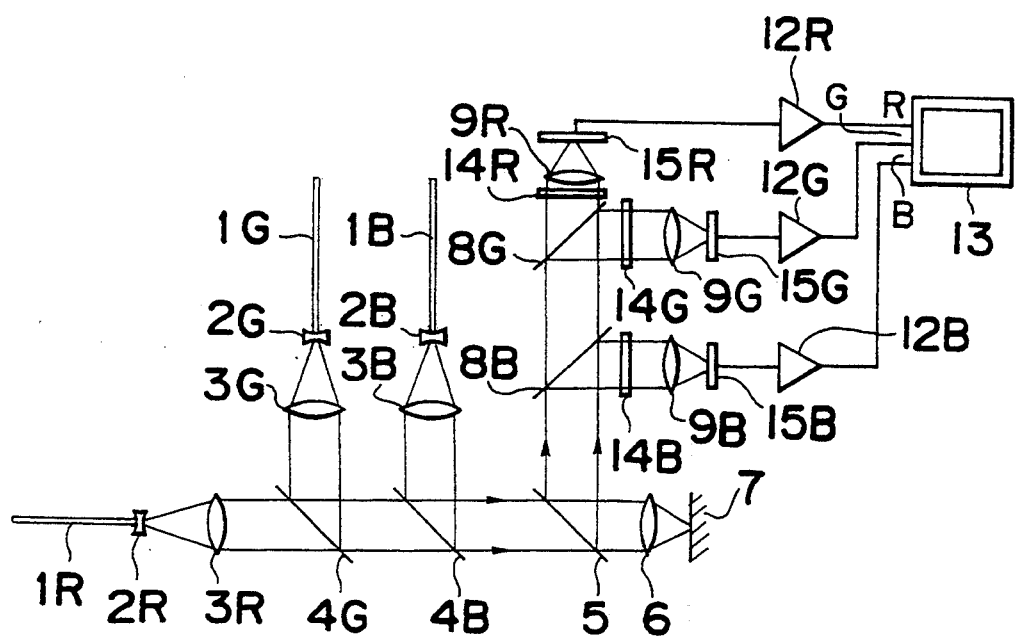
FIG. 1 is a block diagram of a scanning laser microscope according to the first embodiment of the present invention.
Figure 2A:
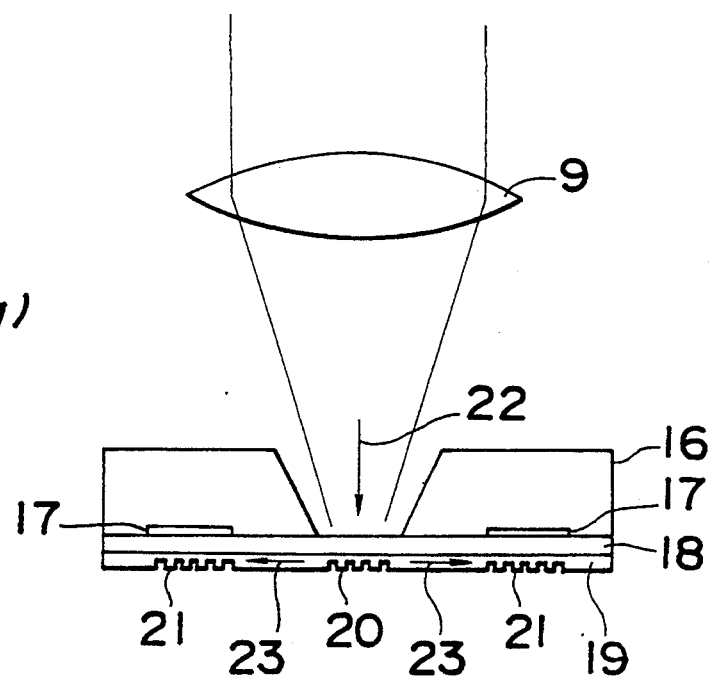
FIGS. 2(a), 2(b), 2(c) and 2(d) are cross sectional views of photo coupling and detecting unit employable in the first preferred embodiment of the present invention, respectively.
Figure 2B:
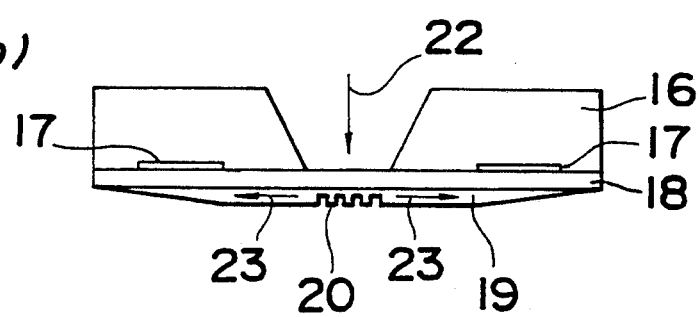
Figure 2C:
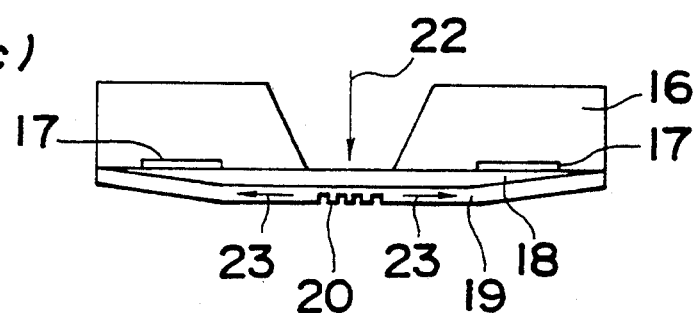
Figure 2D:
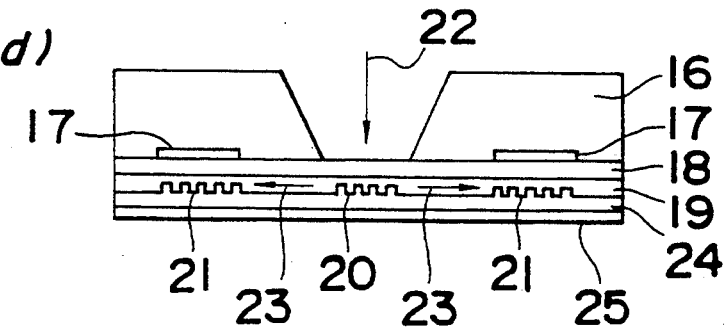

The preferred embodiments of the present invention are described hereinbelow with reference to the accompanying figures, of which FIG. 1 is a block diagram of a scanning laser microscope according to the invention. Note that like parts in FIGS. 1 and 7 are identified by like reference numbers, and further detailed description is omitted.

As shown in FIG. 1, the preferred scanning laser microscope comprises three ¼ wavelength plates 14R, 14G and 14B, focusing lenses 9R, 9G and 9B, and photo coupling and detecting unit 15R, 15G and 15B.

Figure 7:
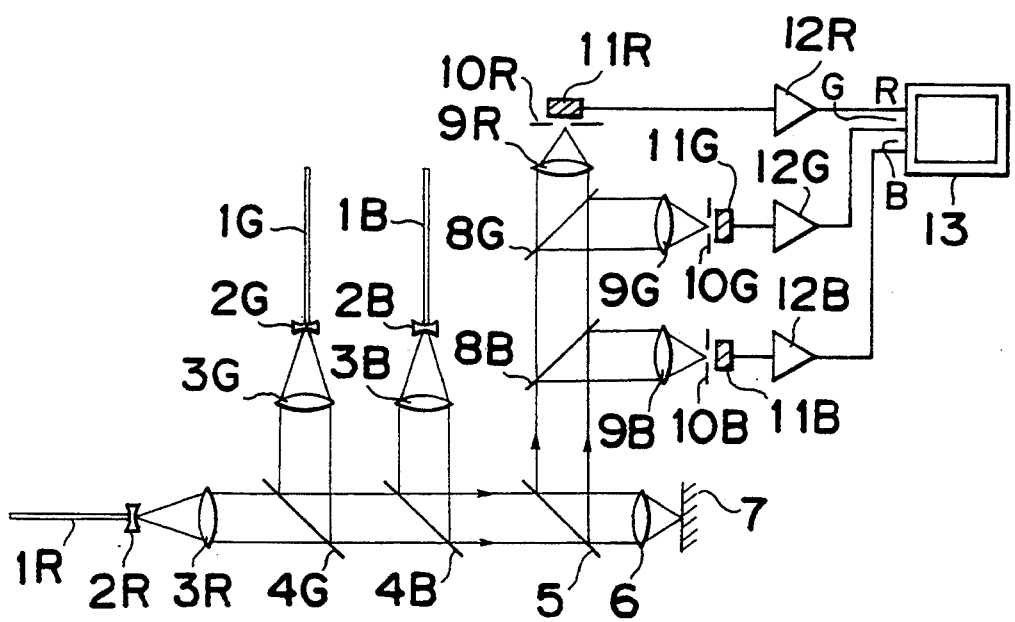
FIG. 7 is a block diagram of a scanning laser microscope according to the prior art.

Referring to FIG. 1, the red laser beam 1R is expanded by the concave lens 2R and convex lens 3R, passes through the dichroic mirrors 4G and 4B and the beam splitter 5, and is focused on the specimen 7 by the objective lens 6, as stated regarding FIG. 7. The reflected light from the specimen 7 is collimated by the objective lens 6, reflected by the beam splitter 5 and passes the dichroic mirrors 8B, 8G and the ¼ wavelength plate 14R, resulting in circularly polarized light. The polarized light is focused by the focusing lens 9R to the red photo coupling and detecting unit 15R. This coupled light (guided light) is detected, and the detection signal is amplified by the video amplifier 12R.

The green laser beam 1G (blue laser beam 1B) is expanded by the concave lens 2G (2B) and convex lens 3G (3B), reflected by the dichroic mirror 4G (4B), passes the beam splitter 5, and is focused on the specimen 7 by the objective lens 6.

The reflected light from the specimen 7 is collimated by the objective lens 6, reflected by the beam splitter 5, reflected by the dichroic mirror 8G (8B), and reflected by the ¼ wavelength plate 14G (14B), resulting in circularly polarized light. The polarized light is focused by the focusing lens 9G (9B) on the corresponding photo coupling and detecting unit 15G (15B). This coupled light (guided light) is detected, and the detection signal is amplified by the green video amplifier 12G (blue video amplifier 12B).

The video signal from the specimen 7 is obtained on the color monitor 13 by capturing these amplified signals and either fixing the light beam and scanning the specimen 7, or fixing the specimen 7 and scanning the light beam. The light input to the photo coupling and detecting unit 15R, 15G and 15B is adjusted by adjusting the relative positions of the focusing lenses 9R, 9G and 9B and the photo coupling and detecting unit 15R, 15G and 15B.

FIGS. 2(a) to 2(d) show various types of the photo coupling and detecting unit 15 in the first embodiment of the invention. As shown in FIG. 2 (a), the photo coupling and detecting unit comprises a Si substrate 16, a ring-shaped photodetector 17 formed on the Si substrate 16 and concentric to a grating 20, a buffer layer 18 formed on the front surface of the Si substrate 16, a wave guide 19 formed over the buffer layer 18, and concentric circular gratings 20 and 21 with a predetermined constant pitch formed on the other surface of the wave guide 19.

It is to be noted that the one grating 20 is formed within a central circular region coaxial to gratings thereof, and the other grating 21 is formed within a ring-shaped region concentric and adjacent to the photodetector 17.

The Si substrate 16 is anisotropically etched partially so that the entire region of the one grating 20 is visible from the back side of the Si substrate 16. The buffer layer 18 also functions as a stopper in the etching process. The light 22 focused by the focusing lens 9 is input to the grating 20 and excites a guided light 23. The guided light 23 is propagated in radial directions, emitted from the other grating 21, and thus detected by the photodetector 17. When the focal length of the focusing lens 9 is sufficiently long and the light 22 is perpendicularly incident to the wave guide 19, the conditions (phase matching conditions) whereby the guided light 23 is excited are given by the next equation [1].

$$L = q\lambda/N \qquad [1]$$

where λ is the wavelength of the incident light, N is the effective refractive index of the wave guide, L is the grating pitch, and q is a natural number.

It is to be noted that there are various other methods of detecting the guided light 23. For example, the guided light 23 can also be emitted and detected by reducing the thickness of the wave guide 19 on the photodetector toward the outer periphery as shown in FIG. 2 (b), and the guided light 23 can be absorbed by the photodetector 17 by reducing the thickness of the buffer layer 18 on the photodetector as shown in FIG. 2 (c).

In addition, as a means of increasing both the input coupling efficiency and the detected light quantity, a buffer layer 24 and reflecting layer 25 can be formed on the wave guide 19 as shown in FIG. 2 (d). This causes the component of the input light 22 that passes the wave guide 19 without exciting the guided light 23 to reflect off the reflecting layer 25 and contribute to the added excitation of the guided light 23, thereby enhancing the input coupling efficiency. In addition, because the component of the emitted light from the grating 21 travelling towards the reflecting layer 25 is thus returned to the photodetector 17 side, the amount of light available for photodetection is increased. It is to be noted that the buffer layer 24 and reflecting layer 25 in FIG. 2 (d) were formed on the model shown in FIG. 2 (a), and the same effect can be obtained by forming them on the models shown in FIGS. 2 (b) and (c).

FIG. 3 illustrates the operation of the photo coupling and detecting unit in the first embodiment of the invention. When the spot of the laser beam on the specimen is at objective lens focal point F, the return light passing through the objective lens 6 and the focusing lens 9 is incident on the grating 20 on the wave guide 19, thus becoming the input light 22 that excites the guided light 23 and is detected. When the spot is offset from focal point F to F' as shown by the dotted line, the return light is no longer perpendicularly incident to the grating 20. This inclined light 22' does not satisfy the phase matching conditions, and the guided light 23 is therefore not excited.

As thus described, the photo coupling and detecting unit in a scanning laser microscope according to the present invention applies a detection principle based on the phase matching conditions of the wave guide, and provides confocal effects equivalent to those provided by the pinholes in a conventional scanning laser microscope. The following advantages are also gained.

(a) It is not necessary for the photo coupling and detecting unit to be on the focal plane of the focusing lens, and the light spot on the wave guide is several hundred times greater than the wavelength. Therefore, the size of the grating 20 is also approximately the size of the above-mentioned large light spot, and while position adjustment on three axes is required, the adjustment is very easy. In addition, the effects of positional shifts in the optical system occurring naturally over time are minimal.

(b) The confocal effects are determined by the coupling length (the radius of the grating 20), and the amount of light used for photodetection, i.e., the input coupling efficiency, is determined by the (coupling length times radiation decay factor). Therefore, both confocal effects and photodetection sensitivity requirements are thus met.

A second embodiment of a scanning laser microscope according to the invention is described below with reference to FIGS. 4(a) and 4(b). Note that like parts in FIGS. 2 and 4(a) and 4(b) are identified by like reference numbers, and further detailed description is omitted.

Figure 4A:
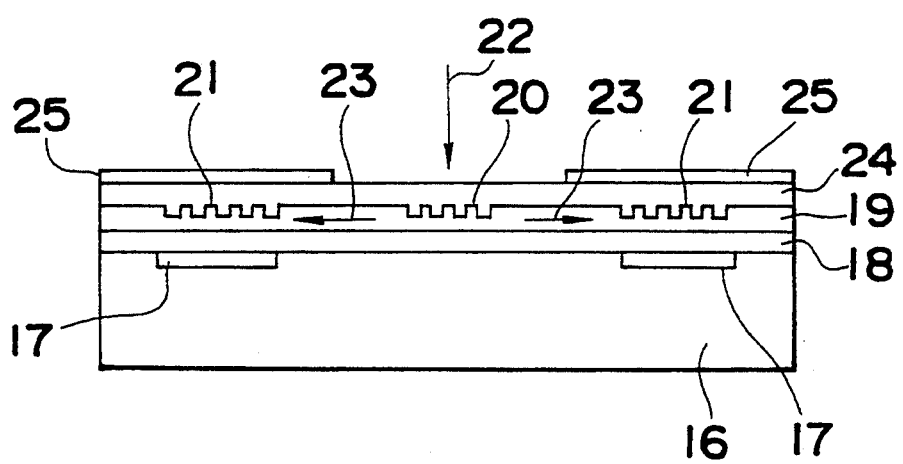
FIGS. 4(a) and 4(b) are cross sectional views of the photo coupling and detecting unit employable in the second embodiment of the present invention, respectively.
Figure 4B:
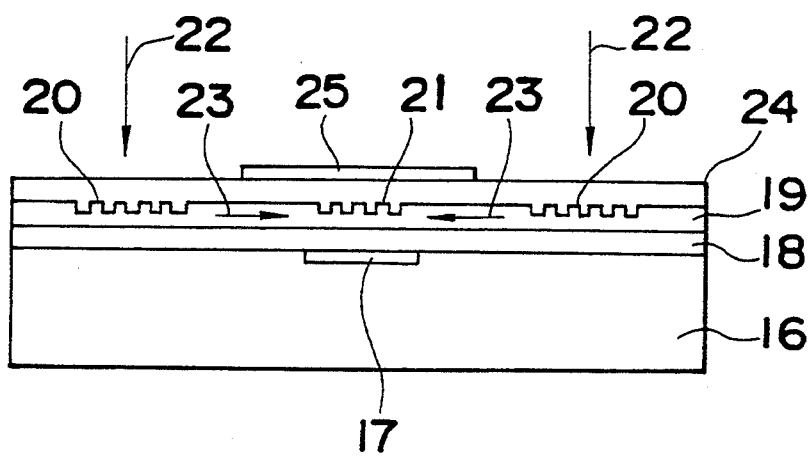

FIGS. 4(a) and 4(b) is a cross section of the photo coupling and detecting unit in the second embodiment of the invention. As shown in FIG. 4 (a), the photo coupling and detecting unit comprises a Si substrate 16, a ring-shaped photodetector 17 formed on the Si substrate 16 and concentric to a grating 20, a buffer layer 18 formed on the front surface of the Si substrate 16, a wave guide 19 formed over the buffer layer 18, and concentric circular gratings 20 and 21 with a predetermined constant pitch formed on the other surface of the wave guide 19.

It is to be noted that the one grating 20 is formed within a concentric, coaxial circular region, and the other grating 21 is formed within a ring-shaped region concentric and adjacent to the photodetector position. The light 22 focused by the focusing lens 9 is input to the grating 20 and excites the guided light 23. The guided light 23 is propagated in the radial direction, emitted from the other grating 21, and thus detected by the photodetector 17. Note that a buffer layer 24 and reflecting layer 25 can also be formed on the wave guide 19. In this case, the reflecting layer 25 covers the photodetector 17. This prevents extraneous non-input light 22 from leaking to the photodetector 17 while causing light emitted from the grating 21 and travelling towards the reflecting layer 25 to return to the photodetector 17, thus increasing the photodetection light quantity.

An alternative version is shown in FIG. 4 (b). Unlike the device shown in FIG. 4 (a), the grating 20 is formed in the outside ring band, and the other grating 21 is formed at the inside ring band. The light 22 focused by the focusing lens 9 thus enters the grating 20 and excites the guided light 23. All other operations and effects are the same as those of the device shown in FIG. 4 (a).

Figure 5:
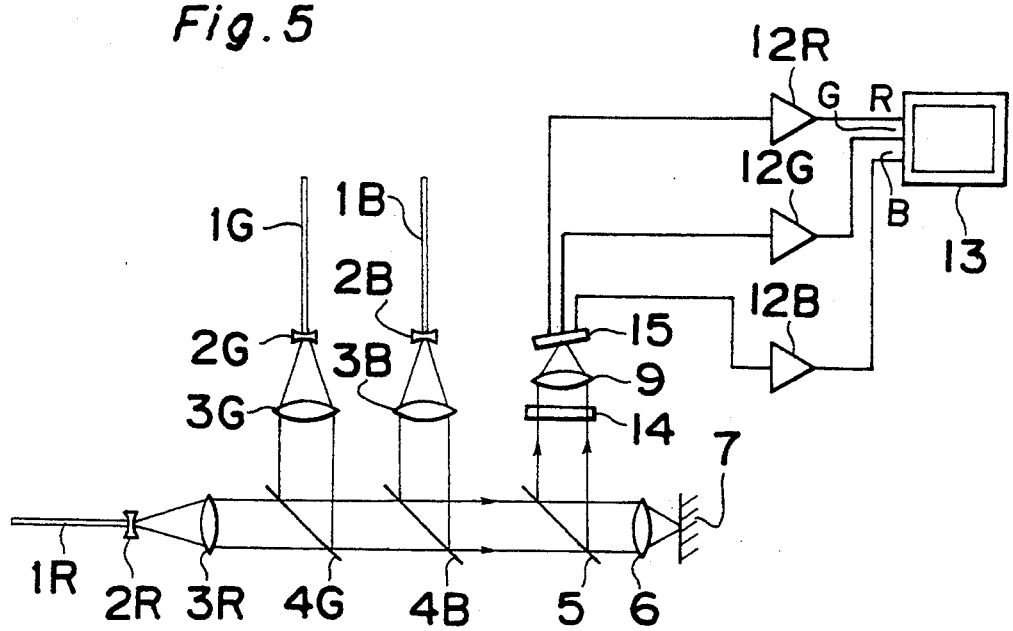
FIG. 5 is a block diagram of a scanning laser microscope according to the third embodiment of the present invention.

A third embodiment of the invention is described below with reference to FIG. 5. Note that like parts in FIGS. 1, 7, and 5 are identified by like reference numbers, and further detailed description is omitted. As shown in FIG. 5, a block diagram of the third embodiment, this scanning laser microscope comprises only a single ¼ wavelength plate 14, focusing lens 9, and photo coupling and detecting unit 15.

Referring to FIG. 5, the red laser beam 1R is expanded by the concave lens 2R and convex lens 3R, passes through the dichroic mirrors 4G and 4B and the beam splitter 5, and is collimated on the specimen 7 by the objective lens 6. The reflected light from the specimen 7 is focused by the objective lens 6, and reflected by the beam splitter 5 and passes the ¼ wavelength plate 14, resulting in circularly polarized light. The polarized light is focused by the focusing lens 9 to the photo coupling and detecting unit 15, which is provided at an angle to the optical axis. This coupled light (guided light) is detected, and then signal amplified by the video amplifier 12R.

The green laser beam 1G (blue laser beam 1B) is expanded by the concave lens 2G (2B) and convex lens 3G (3B), reflected by the dichroic mirror 4G(4B) and passes the beam splitter 5, and is focused on the specimen 7 by the objective lens 6.

The reflected light from the specimen 7 is collimated by the objective lens 6, and reflected by the beam splitter 5 and passes the ¼ wavelength plate 14, resulting in circularly polarized light. The polarized light is focused by the focusing lens 9 to the photo coupling and detecting unit 15, and the coupled (guided) light is detected and then signal amplified by the green video amplifier 12G (blue video amplifier 12B).

The video signal from the specimen 7 is obtained on the color monitor 13 by capturing these amplified signals and either fixing the light beam and scanning the specimen 7, or fixing the specimen 7 and scanning the light beam. It is to be noted that the three laser light colors (red, green, blue) cannot be completely converted to circularly polarized light by the single ¼ wavelength plate 14, but if a medium wavelength (green) ¼ wavelength plate 14 is used, green can be converted to circularly polarized light, and red and blue can be converted to elliptic polarized light, equal to nearly circularly polarized light. In addition, the photo coupling detecting unit is constructed identically to that described in the first embodiment above except for the photodetector, and further description is therefore omitted.

Figure 6A:
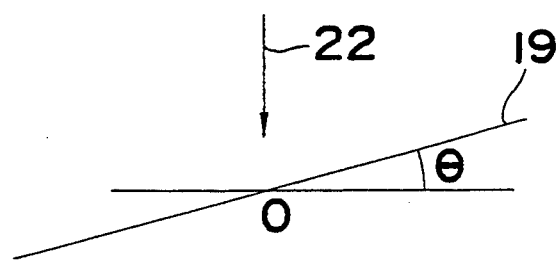
FIGS. 6(a) and 6(b) are illustrations used to describe the photodetection principle of a scanning laser microscope according to the third embodiment of the present invention.
Figure 6B:
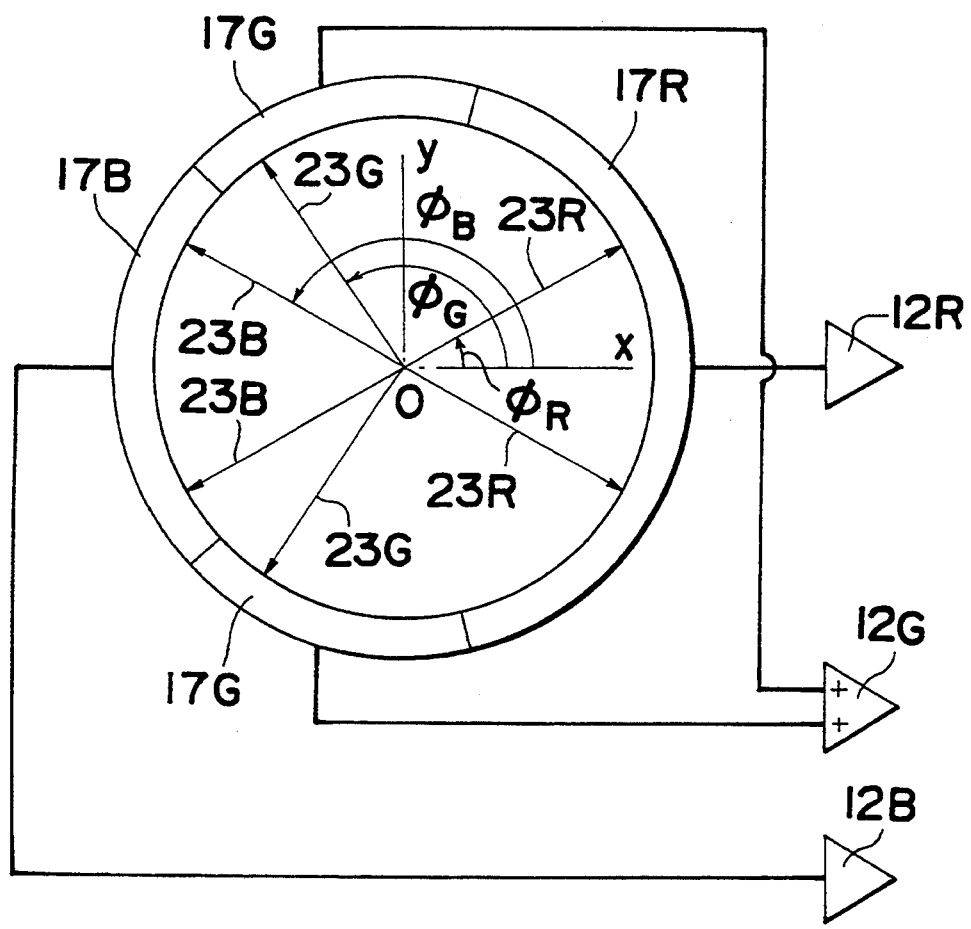
Figure 8:
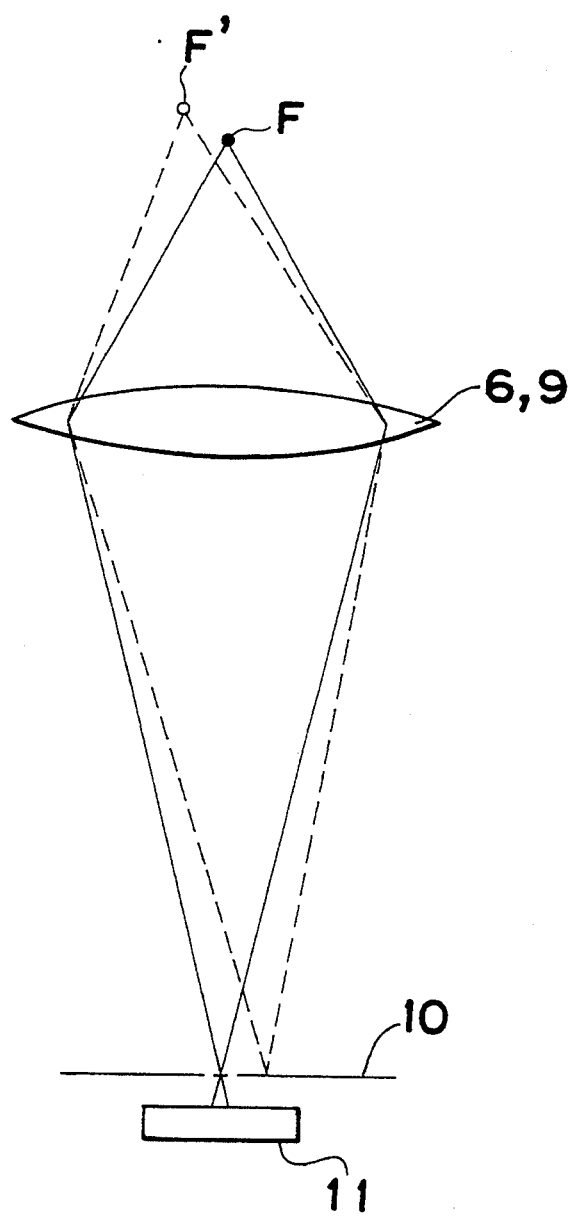
FIG. 8 is an illustration used to describe the effect of inserting pinholes in a scanning laser microscope according to the prior art.

FIGS. 6(a) and 6(b) are used to describe the photodetection principle of the third embodiment of the invention. The wave guide 19 is inclined $\theta$ degrees to the normal plane (xy coordinates) of the optical axis (z axis) of the input light. If the normal line of the wave guide is in the xz plane, the phase matching conditions (conditions where coupling wave plane mismatch=0) are defined by equation [2].

$$\kappa N - \{(\kappa\sin\theta - \kappa\cos\Phi)^2 + (\kappa\sin\Phi)^2\}^{\frac{1}{2}} = 0 \quad [2]$$

where $\kappa$ is the wave number ($=2\pi/\lambda$), K is the size of the grating vector of the grating ($=2\pi/\Lambda$), $\Phi$ is the declination angle in the xy coordinates, and the declination angle $\Phi$ obtained as the solution to equation [2] is the azimuth of the excited guided light propagation. Equation [3] can be substituted for equation [2].

$$\cos\Phi = \{\lambda/\Lambda - (\Lambda/\lambda)(N^2 - \sin^2\theta)\}/2\sin\theta \quad [3]$$

Therefore, when $\theta \neq 0$, the solution for $\Phi$ will change if the wavelength $\lambda$ differs. In practice, wavelength dispersion of the effective refractive index must be considered, but even if this is ignored, N is fixed at 1.70, $\theta = 15°$ and $\Lambda = 0.33$ μm, then $\Phi_R \pm 30°$ when $\lambda = 0.633$ μm (red laser light), $\Phi_G = \pm 119°$ when $\lambda = 0.515$ μm (green laser light), and $\Phi_B = \pm 146°$ when $\lambda = 0.488$ μm (blue laser light).

As a result, the photodetector is divided into three regions 17R, 17G, and 17B as shown by the solid lines in FIG. 6(b) along the radius vectors, the red, green, and blue guided light 23R, 23G, and 23B propagated along each azimuth is detected, and the resulting signals are amplified by the video amplifiers 12R, 12G, 12B.

Because the red, green, and blue laser light can be separately detected in the third embodiment using a single photo coupling and detecting unit inclined at an angle in place of the two dichroic mirrors in the other embodiments, the optical system can be greatly simplified compared with the first embodiment, and a low cost scanning laser microscope with a simple construction can be provided.

It is to be noted that the grating 20 can also be divided into three regions of differing pitches along a line following the radius vectors, and input light of each wavelength can be coupled with the guided light in each region. With this construction it is necessary to precisely set the pitch of each region to satisfy the conditions of equation [1], but so doing makes it possible to greatly simplify the optical system to a degree comparable with the third embodiment.

It is to be noted that the preferred embodiments of the present invention have been described using a reflection scanning laser microscope by way of example, but the same effects can be obtained in a transmittance-type scanning laser microscope. Furthermore, the gratings are described as being concentric, but the same net effects can be obtained using a different configuration.

By means of a scanning laser microscope according to the present invention as thus described, adjustment is extremely simple and the secular change on the positioning precision of the optical system are minimized because the photodetection position is not on the focal plane and the light spot is sufficiently large. In addition, confocal effects and detection sensitivity can be balanced because a detection principle using the phase matching conditions of the wave guide is applied. Finally, a low cost scanning laser microscope with a simple construction and greatly simplified optical system can be provided by replacing two discrete dichroic mirrors with a single photo coupling and detecting unit that is inclined at an angle to separate and detect the red, green, and blue lights.

Further, the prism coupler can be used instead of the grating coupler.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scanning laser microscope comprising: laser light source means,
    objective lens means for focusing light from said laser light source means on a specimen,
    condenser means for condensing light from said specimen,
    light receiving means arranged to receive light condensed by said condenser means,
    light coupling means arranged on said light receiving means which excites a guided light when said condensed light is incident to said light receiving means, and
    a photodetector for detecting said guided light having been excited by said light coupling means.

2. The scanning laser microscope according to claim 1 wherein said light receiving means is comprised of a wave guide layer formed on a buffer layer which is formed on a substrate.

3. The scanning laser microscope according to claim 2 wherein said light coupling means is comprised of at least one concentric grating formed on said wave guide layer.

4. The scanning laser microscope according to claim 3 wherein said wave guide layer is arranged inclined to a plane perpendicular to the optical axis of said condenser means by a predetermined angle.

5. The scanning laser microscope according to claim 4 wherein at least three photodetectors for lights having wavelengths different from each other are arranged at different angle positions relative to the center of said concentric grating, said different angle positions being determined depending upon said wavelengths of said lights.

6. The scanning laser microscope according to claim 2 wherein said photodetector is arranged between said buffer layer and said substrate.

7. The scanning laser microscope according to claim 2 wherein said substrate has a hole through which the condensed light is incident onto said wave guide layer via said buffer layer.

8. The scanning laser microscope according to claim 2 wherein said wave guide layer provides means for deflecting said guided light toward said photodetector.

9. The scanning laser microscope according to claim 2 wherein a surface of said wave guide layer is covered by a second buffer layer and a cover layer, said cover layer formed on said second buffer layer, said cover layer forming an aperture through which the condensed light is introduced to said wave guide layer via said second buffer layer.

* * * * *